United States Patent
O'Quin

(10) Patent No.: US 7,216,875 B2
(45) Date of Patent: May 15, 2007

(54) SHOPPING CART HAVING CASTER LIFT

(75) Inventor: Taft O'Quin, Inola, OK (US)

(73) Assignee: Unarco Industries, Inc., Wagoner, OK (US)

( * ) Notice: Subject to any disclaimer, the term of this patent is extended or adjusted under 35 U.S.C. 154(b) by 0 days.

(21) Appl. No.: 11/228,810

(22) Filed: Sep. 16, 2005

(65) Prior Publication Data

US 2007/0063460 A1 Mar. 22, 2007

(51) Int. Cl.
*B62B 5/00* (2006.01)
(52) U.S. Cl. .................................. 280/33.991
(58) Field of Classification Search ........... 280/33.991, 280/33.992, 33.994, 33.997, 79.11, 79.2, 280/47.34, 47.35
See application file for complete search history.

(56) References Cited

U.S. PATENT DOCUMENTS

| | | | | |
|---|---|---|---|---|
| 3,015,494 A | * | 1/1962 | Fosbrook, Sr. | ......... 280/33.991 |
| 4,647,055 A | * | 3/1987 | Weill | ...................... 280/33.992 |
| 5,409,245 A | * | 4/1995 | Kern et al. | ............ 280/33.996 |
| 5,791,666 A | * | 8/1998 | Mainard | ................ 280/33.991 |
| 6,315,306 B1 | * | 11/2001 | Fernie et al. | .......... 280/33.991 |
| 6,488,292 B2 | * | 12/2002 | O'Quin | ................. 280/33.991 |
| 6,923,456 B2 | | 8/2005 | Ryan et al. | |
| 2003/0205875 A1 | * | 11/2003 | Ondrasik et al. | ........ 280/47.34 |
| 2004/0046341 A1 | | 3/2004 | Wilkinson | |
| 2004/0084863 A1 | | 5/2004 | Ryan et al. | |
| 2004/0201187 A1 | | 10/2004 | Ondrasik | |

FOREIGN PATENT DOCUMENTS

GB 2176444 A * 12/1986

* cited by examiner

*Primary Examiner*—Frank Vanaman
(74) *Attorney, Agent, or Firm*—Wood, Phillips, Katz, Clark & Mortimer

(57) ABSTRACT

In a shopping cart, which is nestable with similar carts, a transverse extending member bridges two longitudinally extending members, each mounting a cam-engaging member. Two cams are mounted to the transversely extending members. When engaged by the cam-engaging members of a following cart being nested into the shopping cart, the cams lift a back end of the shopping cart, so as to lift rear casters of the shopping cart.

7 Claims, 1 Drawing Sheet

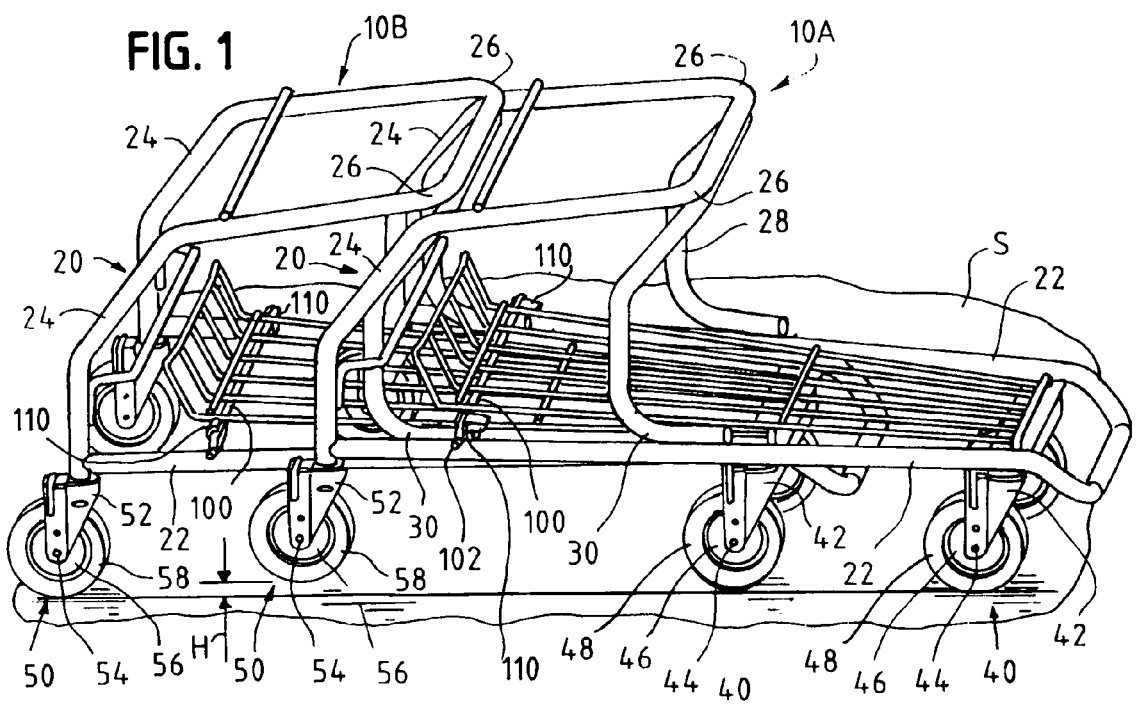
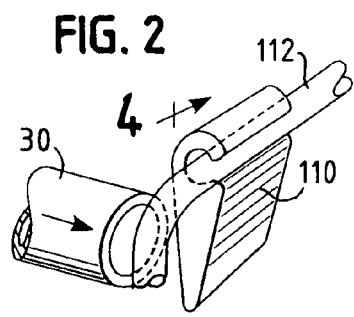
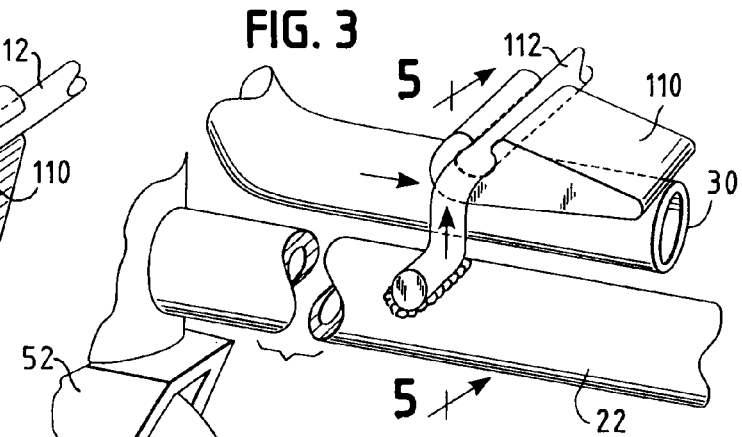
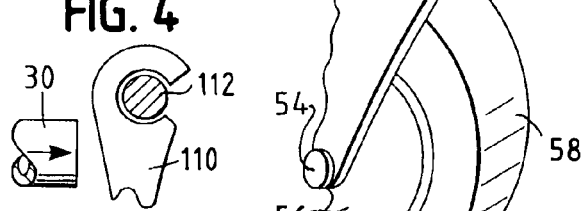
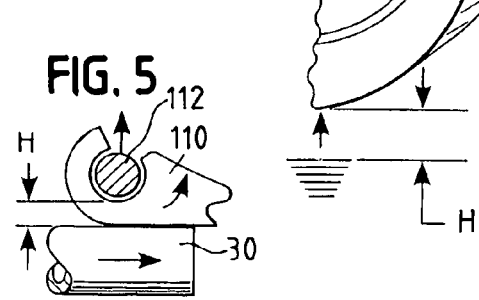
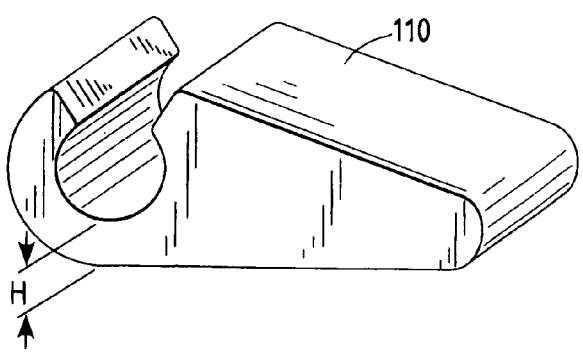

SHOPPING CART HAVING CASTER LIFT

TECHNICAL FIELD OF THE INVENTION

This invention pertains to a shopping cart, which is nestable into a preceding, similarly constructed cart and into which a following, similarly constructed cart is nestable. This invention provides the shopping cart with a rear caster-lifting capability, which reduces wear and damage to rear casters of the shopping cart.

BACKGROUND OF THE INVENTION

Conventionally, a shopping cart is designed to be nestable into a preceding, similarly constructed cart and to enable a following, similarly constructed cart to be nested into the shopping cart. Commonly, in retail stores and in parking areas near retail stores, long lines of nested shopping carts may be formed, which must be moved by store personnel.

Typically, a rear caster comprises a horn, which unlike the horn of a front caster does not swivel and which mounts an axle, and a wheel, which is journalled on the axle, via a bearing, and which has a tread. Moving of a line of nested shopping carts stresses rear casters of the nested carts, tends to cause the horns of said casters to bend, and tends to cause the bearings and treads of said casters to wear excessively, particularly as attempts are made to turn the line of nested shopping carts.

In U.S. Pat. No. 6,923,456 B2, the disclosure of which is incorporated by reference herein, a shopping cart being nestable similarly and having a rear caster-lifting capability is disclosed. The caster-lifting capability reduces wear and damage to rear casters of the shopping cart.

SUMMARY OF THE INVENTION

This invention provides a shopping cart, which is nestable into a preceding, similarly constructed cart and into which a following, similarly constructed cart is nestable. The shopping cart comprises a chassis having a front end and a back end. The chassis includes two longitudinally extending members, each extending along one side of the chassis, between the front and back ends of the chassis, at a lower elevation above a surface supporting the shopping cart. The chassis further includes a transversely extending member bridging the longitudinally extending members. The chassis further includes two cam-engaging members, each cam-engaging member being mounted to a respective one of the longitudinally extending members.

The shopping cart further comprises two cams, each being mounted to the transversely extending member and being spaced above a respective one of the longitudinally extending members. The cam-engaging members are adapted to engage the cams of a preceding, similarly constructed cart, as the shopping cart is being nested into the preceding, similarly constructed cart. The cams are adapted to lift the back end of the shopping cart when the cams are engaged by the cam-engaging members of a following, similarly constructed cart, as the following, similarly constructed cart is being nested into the shopping cart. Preferably, each cam is made from a resilient, polymeric material and is shaped to snap onto the transversely mounted member.

Preferably, each cam is mounted pivotably to the transversely extending member and is pivotable into and from a cart-lifting position, into which said cam is pivoted when engaged by a respective one of the cam-engaging members of a following, similarly constructed cart. Preferably, moreover, each cam is biased toward a dormant position, from which said cam is pivoted into the cart-lifting position when engaged by a respective one of the cam-engaging members of a following, similarly constructed cart. Preferably, moreover, each cam is mounted so as to be freely pivotable and is shaped so as to be gravitationally biased toward the dormant position.

BRIEF DESCRIPTION OF THE DRAWINGS

FIG. 1 is a fragmentary, perspective view of a chassis, front and rear casters, and other lower structures of a shopping cart and of a chassis, front and rear casters, and other lower structures of a similar cart being nested into the shopping cart.

FIG. 2 is an enlarged, fragmentary, perspective detail illustrating one of two cams, which are mounted pivotably on a transversely extending member of the chassis, illustrating a cam-engaging member of the similar cart, and taken as the similar cart is being nested into the shopping cart.

FIG. 3 is a similar detail taken after the similar cart has been nested into the shopping cart.

FIG. 4 is a fragmentary, sectional view, which is taken along line 4—4 of FIG. 2, in a direction indicated by arrows.

FIG. 5 is a fragmentary, sectional view, which is taken along line 5—5 of FIG. 3 in a direction indicated by arrows.

FIG. 6 is a further enlarged, perspective view of one of the cams, apart from other elements of the shopping cart.

DETAILED DESCRIPTION OF THE ILLUSTRATED EMBODIMENT

As illustrated in FIG. 1, two shopping carts are similar, except as disclosed herein, to the shopping cart disclosed in U.S. Pat. No. 5,791,666, the disclosure of which is incorporated herein by reference. It is convenient to refer to the right-hand cart as a preceding cart 10A and to refer to the left-hand cart as a following cart 10B. The shopping carts 10A, 10B, are illustrated as standing on an underlying surface S, such as a floor.

Each shopping cart 10A, 10B, comprises a chassis 20 having two longitudinally extending, tubular steel members 22, one along each side of the chassis 20, having two rear, tubular steel, generally upright members 24, which are welded to the longitudinally extending members 22 and which extend frontwardly at the upper ends 26 of the rear uprights 24, and having two intermediate, tubular steel, generally upright members 28, which are welded to the longitudinally extending members 22, at curved lower portions 30 of the intermediate uprights 28, and to the rear uprights 24, at the upper ends 28 of the rear uprights 24. The lower portions 30 of the intermediate members 28 are curved downwardly and frontwardly and extend above and along the longitudinally extending members 22 where welded to the longitudinally extending members 22. As illustrated and described in U.S. Pat. No. 5,791,666, supra, the shopping cart 10 has a handle structure, a wire or polymeric basket, and other features, details of which are outside the scope of this invention.

The chassis 20 has two front, transversely spaced casters 40, which are mounted to the chassis 20, and two rear, transversely spaced casters 50, which are mounted to the chassis 20. Each front caster 40 comprises a horn 42, which is adapted to swivel about a vertical axis, an axle 44, which is mounted operatively to the horn 42, and a wheel 46, which is journalled on the axle 44, via a bearing, and which has a tread 48. Each rear caster 50 comprises a horn 52, which is not adapted to swivel, an axle 54, which is mounted operatively to the horn 52, and a wheel 56, which is journalled on the axle 54, via a bearing, and which has a tread 58. The bearings of the casters 40, 50, are concealed in the drawings.

The chassis 20 has a transversely extending member 100, which is welded at its opposite ends 102 to longitudinally extending members 22, which extend at a comparatively lower elevation above the supporting surface S, across the chassis 20. The transversely extending member 100, which bridges the longitudinally extending members 22, has a central portion 104 at a comparatively higher elevation above the supporting surface S. The lower portions 30 of the upright members 28 extend along the longitudinally extending members 22 at an intermediate elevation, between the comparatively lower elevation of the longitudinally extending members 22 and the comparatively higher elevation of the central portion 104 of the transversely extending member 100. Where the lower portions 30 extend above and along the longitudinally extending members 22, the lower portions 30 define, for purposes of this invention, two cam-engaging members 30.

Each shopping cart 10A, 10B, further comprises two cams 110. Each cam 110 is mounted to the central portion 110 of the transversely extending member 100 of whichever one of the shopping carts 10A, 10B, has said cam 110 so as to be thus spaced above a respective one of the longitudinally extending members 22 of the same one of the shopping carts 10A, 10B. The cam-engaging members 30 of the shopping cart 10B are adapted to engage the cams 100 of the shopping cart 10A, as the shopping cart 10B is being nested into the shopping cart 10A. The cams 110 of the shopping cart 10A are adapted to lift the back end of the shopping cart 10A, so as to lift the rear casters 50 of the shopping cart 10A by a distance H indicated in the drawings, when the cams 110 of the shopping cart 10A are engaged by the cam-engaging members 30 of the shopping cart 10B, as the shopping cart 10B is being nested into the shopping cart 10A.

As illustrated, each cam 110 is molded from an engineering polymer, such as nylon 6, and is shaped to snap onto the transversely mounted member 100 mounting said cam 110. In FIG. 2 and FIG. 4, one said cam 100 is illustrated in a dormant position. In FIG. 3 and FIG. 5, the same cam 110 is illustrated in a cart-lifting position.

Moreover, each cam 110 is mounted pivotably to the central portion 110 of the transversely extending member 100 mounting said cam 110 so as to be freely pivotable into and from the cart-lifting position, into which said cam 110 is pivoted when engaged by a respective one of the cam-engaging members 30 of a following, similarly constructed cart. Each cam is 100 is shaped so as to be gravitationally biased toward the dormant position, from which said cam 110 is pivoted into the cart-lifting position when engaged by a respective one of the cam-engaging members 30 of a following, similarly constructed cart.

The shopping carts 10A, 10B, exemplify any two nested carts in a long line of nested shopping carts. Because the rear casters of the nested carts are elevated above the underlying surface, except for the rear casters of the final cart in the line, moving of the line of nested shopping carts does not stress the elevated casters, does not tend to cause the horns of the elevated casters to bend, and does not tend to cause the bearings or treads of the elevated casters to wear excessively, particularly as attempts are made to turn the line of nested shopping carts.

Because all casters touching the underlying surface can swivel, except for the rear casters of the final cart in the line, the line can be turned easily.

The invention claimed is:

1. A shopping cart, which is nestable into a preceding, similarly constructed cart and into which a following, similarly constructed cart is nestable, the shopping cart comprising a chassis having a front end and a back end, the chassis including two longitudinally extending members, each extending along one side of the chassis, between the front and back ends of the chassis, the chassis further including a transversely extending member bridging the longitudinally extending members, the chassis further including two cam-engaging members, each cam-engaging member being mounted to a respective one of the longitudinally extending members, the shopping cart further comprising two cams, each being mounted to the transversely extending member and being spaced above a respective one of the longitudinally extending members, wherein the cam-engaging members are adapted to engage the cams of a preceding, similarly constructed cart, as the shopping cart is being nested into the preceding, similarly constructed cart, wherein the cams are adapted to lift the back end of the shopping cart when the cams are engaged by the cam-engaging members of a following, similarly constructed cart, as the following, similarly constructed cart is being nested into the shopping cart, wherein each cam is mounted pivotably to the transversely extending member and is pivotable into and from a cart-lifting position, into which said cam is pivoted when engaged by a respective one of the cam-engaging members of a following, similarly constructed cart, and wherein each cam is biased toward a dormant position, from which said cam is pivoted into the cart-lifting position when engaged by a respective one of the cam-engaging members of a following, similarly constructed cart.

2. The shopping cart of claim 1, wherein each cam is mounted so as to be freely pivotable and is shaped so as to be gravitationally biased toward the dormant position.

3. The shopping cart of claim 2, wherein the transversely extending member has an outer, circular cross-section, at least where the cams are mounted.

4. The shopping cart of claim 1, wherein each cam is made from a resilient, polymeric material and is shaped to snap onto the transversely mounted member.

5. The shopping cart of claim 2 wherein each cam is made from a resilient, polymeric material and is shaped to snap onto the transversely mounted member.

6. The shopping cart of claim 3, wherein each cam is made from a resilient, polymeric material and is shaped to snap onto the transversely mounted member.

7. A shopping cart, which is nestable into a preceding, similarly constructed cart and into which a following, similarly constructed cart is nestable, the shopping cart comprising a chassis having a front end and a back end, the chassis including two longitudinally extending members, each extending along one side of the chassis, between the front and back ends of the chassis, the chassis further including a transversely extending member bridging the longitudinally extending members, the chassis further including two cam-engaging members, each cam-engaging member being mounted to a respective one of the longitudinally extending members, the shopping cart further comprising two cams, each being mounted to the transversely extending member and being spaced above a respective one of the longitudinally extending members, wherein the cam-engaging members are adapted to engage the cams of a preceding, similarly constructed cart, as the shopping cart is being nested into the preceding, similarly constructed cart, wherein the cams are adapted to lift the back end of the shopping cart when the cams are engaged by the cam-engaging members of a following, similarly constructed cart, as the following, similarly constructed cart is being nested into the shopping cart, wherein each cam is mounted pivotably to the transversely extending member and is pivotable into and from a cart-lifting position, into which said cam is pivoted when engaged by a respective one of the cam-engaging members of a following, similarly constructed cart, and wherein each cam is made from a resilient, polymeric material and is shaped to snap onto the transversely mounted member.

\* \* \* \* \*